United States Patent [19]
Rodriguez

[11] 4,030,689
[45] June 21, 1977

[54] CANOPY RELEASE ACTIVATING DEVICE FOR PARACHUTES

[76] Inventor: Jose E. Rodriguez, 6107 A Yadkin Road, Fayetteville, N.C. 28303

[22] Filed: Feb. 9, 1976

[21] Appl. No.: 656,744

[52] U.S. Cl. .................. 244/151 B; 24/201 R
[51] Int. Cl.² ............................ B64D 17/38
[58] Field of Search ............ 244/147, 148, 151 R, 244/151 A, 151 B; 24/201 R, 201 A, 197, 230 R, 230 AM, 230 AK, 215.17; 2/DIG. 6

[56] References Cited
UNITED STATES PATENTS

| 2,473,554 | 6/1949 | Warner | 24/230 AM |
| 3,200,463 | 8/1965 | Craven et al. | 24/230 AM |
| 3,934,848 | 1/1976 | Snyder | 244/151 A |

FOREIGN PATENTS OR APPLICATIONS 139,725  3/1953  Sweden .................. 24/230 AM

*Primary Examiner*—Trygve M. Blix
*Assistant Examiner*—Galen L. Barefoot

[57] ABSTRACT

A fabric activator includes a webbing strip with a bracket secured thereto which operatively connects the fabric strip to the slider of the female fitting of a conventional canopy release system. The slider is moved back and forth responsive to a force or pull on the strip in one direction or another. The strip is normally held in a first, upper position (canopy release system locked) by a quick release fabric fastener. A second transverse strip is folded with the ends releasably secured together across the first strip to act as a protective cover.

5 Claims, 5 Drawing Figures

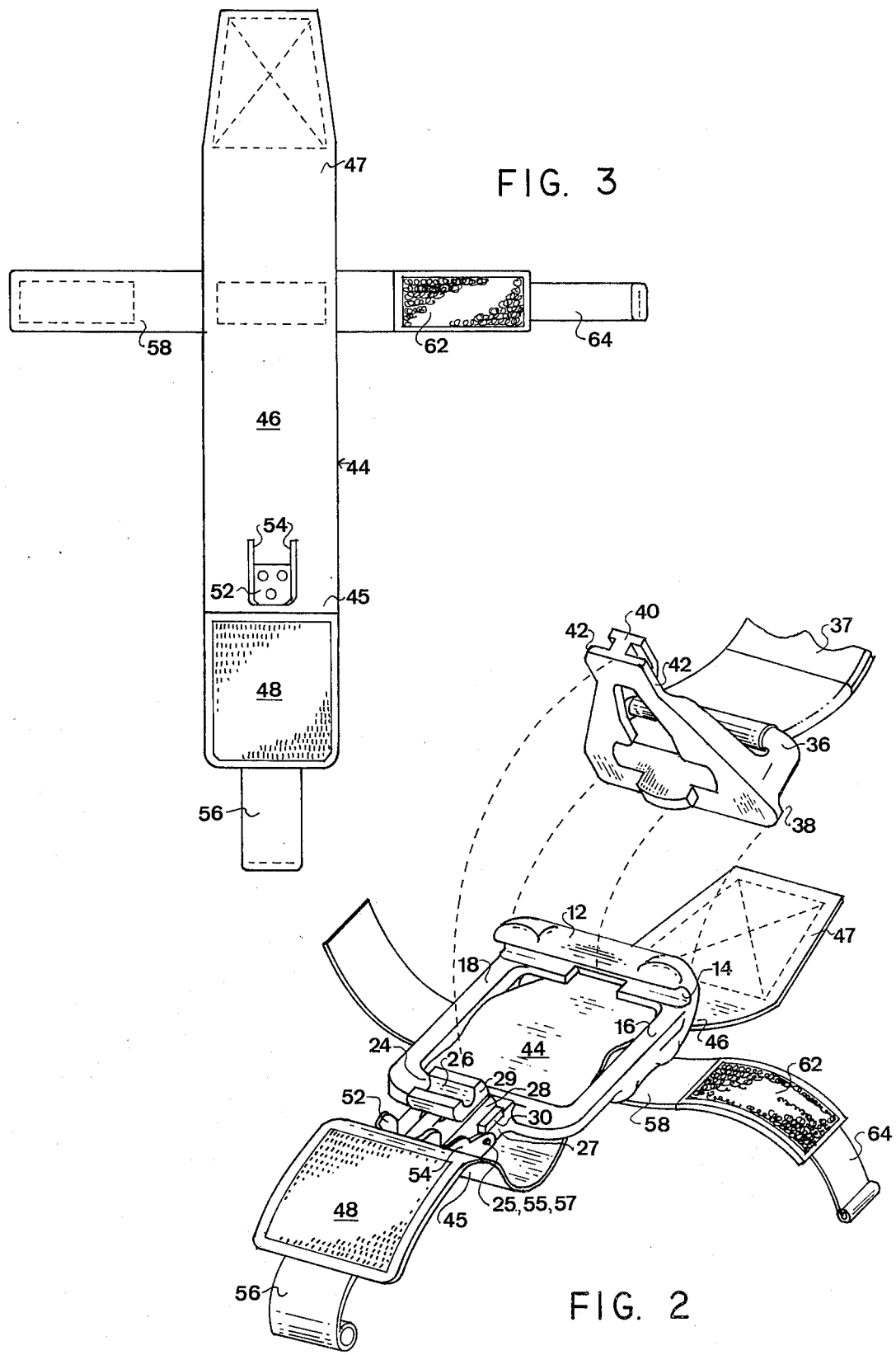

CANOPY RELEASE ACTIVATING DEVICE FOR PARACHUTES

BACKGROUND OF THE INVENTION

It has become conventional practice in both military and sport parachuting to rig the main parachute harness with a canopy release mechanism. In case of a malfunction in the main chute, the canopy, suspension lines, risers, and associated gear can then be completely ejected before the auxiliary or reserve chute is deployed. This insures that the reserve parachute will not become entangled with the malfunctioning main parachute.

Several types of canopy release systems have been developed, such as the Capewell release system (United States Pat. No. 2,473,554), which basically includes a male fitting attached to the chute riser with a heel and nose portion which fit respectively into a corresponding recess and beneath a slider of a female fitting, which in turn is attached to the chute harness. A cover and latch assembly, a rather complex and bulky metallic assembly, is operatively attached to the slider, which is the movable portion of the female fitting that normally locks in the male fitting. Upon removal of the cover and a yank of the latch ring, the male fitting and riser and, resultingly, the canopy and suspension lines are released and discarded. Other systems, which are modifications of the Capewell release system include the "One Shot" system, and the "Rocket Jet" system. In the One Shot system, the male and female fittings are substantially the same as the Capewell release system, and as the cover is released, a wire attached to the cover pulls the slider to the unlocked position. In the Rocket Jet system, which is entirely different, a pair of side buttons are pushed in simultaneously which releases the cover to be slid upwardly. Responsive to this movement the male fitting is released and the canopy discarded.

Each of the above systems are somewhat objectionable. For example, in the basic, most popular Capewell release system, malfunctions have been known to occur for one of several reasons. Rings have been known to be pulled out of the latch mechanism without moving the slider to the unlocked position. Also, a significant hazard results from the protruding safety cover and ring-type activating latch which releases the male member. Because of the several metallic parts protruding from the parachutist's chest at various angles, it is easy for the suspension lines of the reserve chute to become entangled in the cover and latch activating device, so that the reserve chute does not function properly. In such cases where the main canopy is not properly released, as well as in cases where the reserve chute suspension lines become entangled, a malfunction is likely to cause severe injury or death to the parachutist.

Summary of the Present Invention

In the present invention, on the other hand, efforts have been made to simplify and improve the activating means which releases the male and female portions of the Capewell release system. The bulky, exposed cover and latch devices with corners and edges on which the suspension lines of the reserve chute can become entangled are eliminated. The sometimes difficult to operate ring or lanyard pull which activates the slider of the female portion is eliminated.

The objectionable cover and ring activated latch are replaced by a first fabric or webbing strip, which extends from under the rear portion of the female fitting, and the free ends thereof are wrapped around and over the bottom and top of the assembled male and female fittings and overlapped and secured together by a quick release fabric fastener, preferably of the type known as "Velcro," although snaps, or an eye and hook assembly could also be used. A bracked secured to the lower end of the webbing strip adjacent the slider is pivotally attached to the female fitting in operative engagement with the slider thereof. A downward tug of the lower end of the strip, which is normally held in a folded up position by the quick release fabric fastener, will then move the slider from the locking position to the release position, whereupon the male fitting is free and the drag of the chute will pull it from the female fitting in a well-known manner.

A second, transverse elastic strip is secured to the intermediate portion of the webbing strip and includes opposite ends which fold around the sides of the assembled male and female fittings and overlap each other atop the overlapped ends of the first webbing strip. A second, quick release fabric fastener, which may also be Velcro, releasably holds the overlapped ends of the second strip together, to act as a protective cover preventing an inadvertent force on the webbing strip which might possibly release the canopy.

It is therefore an object of the present invention to provide an improved activating device for canopy release systems which is both more reliable in the release of the male fitting, as well as less likely to snag the suspension lines of the reserve chute.

It is further an object of the present invention to provide an improved activating device for canopy release systems which is fabricated substantially entirely of textile material, rather than metallic elements.

It is yet another object of the present invention to provide an improved activating device for canopy release systems which, upon release of the canopy, does not leave any exposed metallic members on the chutist's chest in the path of the reserve chute.

Other objects and a fuller understanding of the present invention will be apparent from reading the following detailed description of a preferred embodiment in conjunction with the accompanying drawings, in which:

FIG. 2 is a perspective view, similar to FIG. 1, except illustrating the release mechanism a short time after it has been opened by the activator according to the present invention;

FIG. 3 is a top or plan view of the activator alone removed from the female fitting;

DETAILED DESCRIPTION OF A PREFERRED EMBODIMENT

Figure 1:
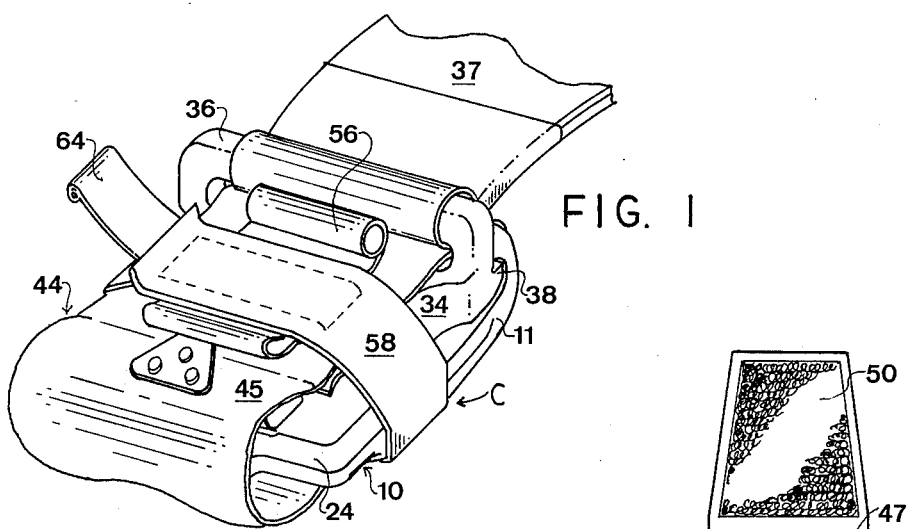
FIG. 1 is a perspective view of a quick release device assembled and retained in the closed or locked position by the activator of the present invention.

Referring now to FIGS. 1 and 2, there is illustrated a canopy release system C which is operated by the activating device 44 according to the present invention. In general terms, the activating device 44 includes a textile fabric or webbing strip 46 having a lower end portion 45 connected to the conventional lock/unlock slider 28 by a bracket 52. When the lower end 45 of webbing strip 46 is moved to a first, uppermost position overlying the female fitting 10 and male fitting 34, the aforementioned bracket 52 moves the aforementioned slider 28 to its uppermost or locking position, thus retaining the male fitting 34 securely within female fitting 10. Upon release of the upper portion 45 of strip 46 and responsive to a downward pull thereon, the bracket 52 urges the slider 28 downwardly, thus unlocking and releasing male fitting 34. The resulting lift and drag on the parachute pulls the canopy away, so that the parachutist can release the auxiliary chute without fear of its becoming entangled in the main chute.

Figure 5:
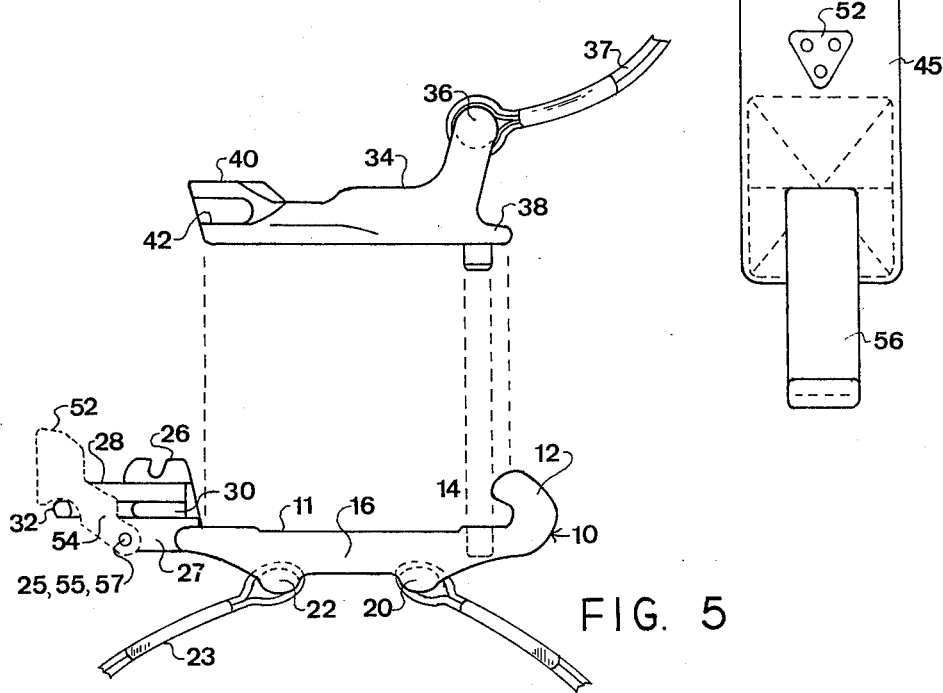
FIG. 5 is an exploded perspective view of the male and female fittings of the canopy release mechanism with the activator completely removed.

Turning now to a more specific description of the female fitting 10 and male fitting 34, in FIG. 5, it can be seen that the female fitting 10 is a steel, frame-like member 11 which includes a top end portion 12 having a transverse recess 14 extending thereacross for receiving a heel portion 38 of the male member 34, as will be described hereinafter. A pair of side members 16, 18 connect the top end portion 12 with a lower end portion 24. A first intermediate cross member 20 receives an upwardly extending harness strap 21, which extends up over the shoulder of the parachutist, while a second intermediate cross member 22 provides a connecting point for a downwardly extending harness strap 23. Thus the female fitting 10 is actually a connecting member for straps of the parachute harness.

A retainer member 26 protrudes outwardly from the lower end portion 24 of female fitting 10 and includes a portion 29 thereof which overlies a pair of downwardly protruding lugs 27, each of which include corresponding openings 25 extending transversely therethrough for reasons to be hereinafter described. A slider 28 is received in sliding relationship between the portions of retainer 26 which overlie lugs 27 and the lugs. A pair of spaced side bosses 30, 32 protrude outwardly from each side of slider 28, and are engaged by the bracket 52 to activate the slider upwardly or downwardly, as will be more fully described hereinafter.

The male fitting 34 is also a steel frame member which is of such a length as to fit between the upper and lower end portions 12, 24 of female fitting 10. A cross member 36, extending transversely across the upper end of male fitting 34 in spaced relation thereto, provides a point of attachment for riser 37. A hell 38 also extends transversely across the upper portion of male fitting 34, and, when assembled, fits into recess 14 in female fitting 10. Nose 40 forms the lower end of fitting 34 and includes a pair of side flats 42 which fit down into the female fitting 10 in the assembled position at a point beneath the slider 28, when moved to the locked position.

Both female fitting 10 and male fitting 34, described hereinabove, are conventional components of the well-known aforementioned Capewell release system, and no further discussion of their construction is deemed necessary. The present invention is directed solely to the activating device which releases the male fitting 34 from the female fitting 10.

Figure 4:
FIG. 4 is a bottom view of the activator removed from the female fitting.

The heart of the invention lies in activator 44, which is formed substantially of a fabric webbing material, such as nylon, and, as illustrated in FIGS. 3, 4, includes a first webbing strip 46 having a lower end portion 45 and an upper end portion 47. A first connecting patch 48 on end portion 45 includes a plurality of minute hooks which, when pressed against a similar patch 50 of minute textile loops on the overlapped opposite surface of the other end portion 47 causes the two overlapping ends to be joined together. This a quick release textile fastening means, commonly known as Velcro.

A small bracket 52, having a pair of opposed legs 54 extending outwardly from the surface of webbing strip 46, is secured to the strip at a position near the hook patch 48 on the top side of activator 44 (FIG. 3). When installed on the female fitting 10, the lower end 45 of strip 46 is folded over so that the legs 54 of bracket 52 extend downwardly past the outer surfaces of lugs 27 (FIG. 2) with the slider 28 therebetween. A rivet 57 extends through corresponding openings 55, 25 in legs 54 and lugs 27 respectively, so that the bracket 55 is pivotally attached to the female fitting 10 with the legs 54 extending between side bosses 30, 32 of slider 28. When the lower end 45 of the webbing strip 46 is folded upwardly into the closed position, the legs 54 of bracket 52 are urged against boss 30 and thus move the slider 28 upwardly to a position overlying the side flats of male fitting 34. Movement of the textile strip downwardly will urge the legs 54 against the other boss 32 and move the slider 28 downwardly, so that the side flats 42 of male fitting 34 are unlocked and freed.

Preferably, though not absolutely necessary, a transverse, elastic strip 58 is secured to the medial portion of webbing strip 46 and adapted to extend around the overlapped and assembled lower portion 45 and upper portion 47 of webbing strip 46 to act as a cover therefor in the closed position. Elastic strip 58 is provided with a hook patch 60 on one ned and a loop patch 62 on the other end thereof which holds the elastic strip in place around the closed ends of webbing strip 46.

The overlapped ends of both the webbing strip 46 and elastic strip 58 are provided with pull tabs 56, 64 to facilitate release of their respective strips. It should be noted that pull tab 56 is positioned substantially centrally of the rear side of hook patch 48, so that considerably more force is required to shear the hooks from the loops than would be required if the pull tab were located at the outer edge of the hook patch 48. The result is a shearing action, and when positioned as illustrated, requires approximately a 10 pound force to release hook patch 48 from loop patch 50. The force required may be adjusted merely by moving the connecting point between pull tab 56 and strip 46 toward or away from the end of the rear side of hook patch 48. The pull tab 64 is located approximately at the end of the loop patch 62, and requires only about a two pound force to release. Also, the pull tab 64 whould be located on the inner side of the canopy release assembly. Thus the tab faces toward the middle of the body, rather than the outside, so that the parachutists can more easily operate the activator device.

In operation, activator 44 is normally positioned within the female fitting 10 as illustrated in FIG. 2, with the medial portion thereof (where the webbing strip 46 and elastic strip 58 are sewed together) lying atop the harness straps 21, 23 on cross members 20, 22. The free ends of the activator 44 are then threaded down and out through openings in female assembly 10, so that they lie beneath top end portion 12, side member 16, 18, and lower end portion 24. As mentioned hereinabove, the legs 54 of bracket 52 are pivotally connected to lugs 27 of the female member by means of a rivet 57. To install the canopy onto the female fitting 10, the male fitting 34 is placed in position in female fitting 10 with the heel 38 in recess 14, and the side flats in position down below the upper edge of lower end portion 24.

The upper end 47 of webbing strip 46 is then threaded through the space between cross member 36 of male fitting 34 and the fitting itself, and the lower end 45 is moved upwardly across retainer 26 of female fitting 10 with the hook patch 48 being pressed into releasable engagement with loop patch 50. The aforesaid movement causes slider 28 to move up across side flats 42 of male fitting 34, so that the male fitting is securely locked in position within the female fitting 10. Pull tab 56 is folded up into position atop the connection of hook patch 48 and loop patch 50. The free ends of elastic strip 58 are then folded around the side members 16, 18 of female fitting 10 and across the top of the assemblage of the overlapped ends of webbing strip 46, whereupon the loop patch 52 is releasably secured to the hook patch 60 of the elastic strip 58 (FIG. 1).

The canopy release system is thus set in the locked position and stays in this position unless and until a malfunction in the canopy or suspension lines of the main chute occur. Upon such a happening, it is necessary to eject the main canopy, which is effected by the following steps. First of all, pull tab 64 is moved outwardly to release the elastic strip 58, which has merely been acting as a protective cover for pull tab 56. The exposed pull tab 56 is pulled downwardly releasing the lower end 45 of webbing strip 46. As the lower end 45 continues its downward movement, the slider 28 is caused to move downwardly, releasing the side flats 42 of the male fitting 34. The lift and drag of the chute will then immediately pull the male fitting through the riser 37 out of its position within the female fitting 10, whereupon the canopy is ejected.

It should, of course, be noted that there is normally provided a canopy release assembly for each shoulder, and each canopy release assembly should have its own activator device as described hereinabove. Further, although a very specific shape of the fabric activator has been shown and described, it is apparent that there are many other configurations which will also operate correctly. For example, while the protective cover formed by the overlapped ends of elastic strip 58 is highly preferable, it is not absolutely necessary. Also, the releasable attachment means which holds lower end 45 of the webbing strip 46 in its upward position does not necessarily have to be the other end of webbing strip 46 looped around the canopy release assembly. A separate strap could be suspended from the upper harness strap 21 and threaded down into the same position assumed by the loop path 50 to hold the lower end portion 45 of strip 46 in its upper, locked position. Therefore, it is only necessary that the lower end 45 be held upright in the normal, locked position, and this could also be effected by a snap or a hook and eye arrangement. There is no substantial force being exerted on the lower end portion 45 of webbing strip 46 tending to unlock the canopy release system, as strip 46 merely supports the weight of slider 28 in its uppermost position. The force exerted by the lift and drag of the chute on male member 34 tending to pull the fitting 34 from the assembly is not acting against the Velcro attachment area. As long as slider 28 remains in its uppermost position, the male fitting 34 remains locked.

It is apparent that other modifications and embodiments are possible without departing from the scope of the present invention, which is to be limited only by the following claims:

That which is claimed is:

1. An activating device for parachute canopy release systems of the type wherein a male fitting is suspended from a canopy riser and includes a heel and nose portion which are received respectively within a corresponding recess and beneath a metallic slider member of a female fitting, which in turn is attached to the chute harness, said activating device comprising:
   a. at least one fabric strip of a length sufficient to be threaded through the under portion of said female fitting with both ends wrapping around and substantially over the assemblage of said male and female fittings, and also having end portions overlapping each other;
   b. a bracket means secured to said fabric strip and pivotally attached to said female fitting in operative engagement with said slider;
   c. said bracket means being movable between a first locking position wherein said slider overlies a portion of said male fitting in its assembled position within said female fitting, and a second release position wherein said slider is removed from its overlying position atop the male fitting, said bracket means being moved from said first to said second position by a downward movement of the lower end of said fabric strip, whereby said riser and canopy are thereby released; and
   d. quick release fabric fastening means for holding said lower end in a first, upper locking position overlapping the upper end of said strip until it is desired to release said canopy, whereupon said lower end is released and pulled downwardly away from said upper end.

2. The activating device according to claim 1 and further including a transverse fabric strip having the medial portion thereof secured to the corresponding medial portion of the first mentioned fabric strip, said transverse strip having the free ends thereof of a length sufficient to wrap around the assemblage of said male and female fittings and over the top of the overlapped ends of said first mentioned fabric strip, quick release fastening means for releasably securing the free ends of said transverse strip together, thereby forming a protective cover for the activating device.

3. The activator according to claim 2 wherein said one fabric strip is formed of a nylon webbing and said transverse fabric strip is formed substantially of an elastic material and wherein said quick release fastening means comprise selectively mating patches of minute hooks and soft loops commonly called Velcro.

4. An activator for parachute canopy release systems of the type wherein a male fitting is suspended from a canopy riser, the male fitting further including a heel and nose portion which are received respectively within a corresponding recess and beneath a slider member of a female fitting, which in turn is attached to the chute harness, and wherein the slider is movable between a locking position overlying said nose portion and a release position removed from atop said nose portion, said activator comprising:
   a. a bracket means engaging said slider for moving the slider back and forth between said locking position and said release position;

b. a fabric strip attached to said bracket and movable between an upper position in which said bracket urges said slider to the locking position and a lower position in which said bracket urges said slider to the release position, and c. attachment means for normally releasably securing said fabric strip in said upper position.

5. The activator according to claim 4 wherein said attachment means comprises a pair of mating patches, one of said patches including a plurality of minute hooks on the surface and the other patch including soft fabric loops, and further wherein one of said patches is secured to said fabric strip.

* * * * *